US010585829B2

(12) United States Patent
Scholz et al.

(10) Patent No.: US 10,585,829 B2
(45) Date of Patent: Mar. 10, 2020

(54) ELECTRICAL INTERFACE MODULE (71) Applicant: PHOENIX CONTACT GMBH & CO. KG, Blomberg (DE)

(72) Inventors: Peter Scholz, Brakel (DE); Lars-Peter Wimmer, Hameln (DE)

(73) Assignee: PHOENIX CONTACT GMBH & CO. KG (DE)

( * ) Notice: Subject to any disclaimer, the term of this patent is extended or adjusted under 35 U.S.C. 154(b) by 111 days.

(21) Appl. No.: 15/129,371

(22) PCT Filed: Apr. 2, 2015

(86) PCT No.: PCT/EP2015/057321
§ 371 (c)(1),
(2) Date: Sep. 26, 2016

(87) PCT Pub. No.: WO2015/150521
PCT Pub. Date: Oct. 8, 2015

(65) Prior Publication Data
US 2017/0116145 A1 Apr. 27, 2017

(30) Foreign Application Priority Data
Apr. 3, 2014 (DE) .......................... 10 2014 206 387

(51) Int. Cl.
G06F 13/38 (2006.01)
G06F 13/42 (2006.01)

(52) U.S. Cl.
CPC ........ G06F 13/385 (2013.01); G06F 13/4282 (2013.01); G06F 2213/3814 (2013.01)

(58) Field of Classification Search
CPC ............... G06F 13/385; G06F 13/4282; G06F 2213/3814
See application file for complete search history.

(56) References Cited

U.S. PATENT DOCUMENTS 5,179,670 A * 1/1993 Farmwald ........... G06F 13/4068
710/104
5,249,979 A * 10/1993 Deinhardt ............ H05K 7/1465
361/729
(Continued)

FOREIGN PATENT DOCUMENTS

DE 10058524 6/2002
DE 102005025645 12/2006
(Continued)

OTHER PUBLICATIONS

International Search Report prepared by the European Patent Office dated Jun. 3, 2015, for International Application No. PCT/EP2015/057321.
(Continued)

Primary Examiner — Eric T Oberly
(74) Attorney, Agent, or Firm — Sheridan Ross P.C.

(57) ABSTRACT

The object of the invention is an electrical interface module. The electrical interface module has a memory device for storing data and an integrated wireless interface that makes data available to an external reading device, wherein the electrical interface module can exchange data with other nearby electrical interface modules via the integrated wireless interface, wherein adjacent electrical interface modules form a logical bidirectional data bus via the integrated wireless interfaces, wherein data are made available by one nearby electrical interface module or by the other nearby electrical interface modules via the integrated wireless interface(s) in the manner of a bus to the external reading device, and wherein each electrical interface module makes a unique identification available via the integrated wireless interface, so that each electrical interface module is unambiguously identifiable.

18 Claims, 6 Drawing Sheets

(56) References Cited

U.S. PATENT DOCUMENTS

| | | | |
|---|---|---|---|
| 6,144,888 A | 11/2000 | Lucas et al. | |
| 6,766,143 B1* | 7/2004 | Beckwith | H04W 84/18 343/784 |
| 7,768,392 B1* | 8/2010 | Brand | G01D 21/00 340/539.13 |
| 2002/0196789 A1* | 12/2002 | Patton | H04L 1/188 370/400 |
| 2003/0006878 A1 | 1/2003 | Chung | |
| 2003/0018930 A1* | 1/2003 | Mora | H04L 67/104 714/42 |
| 2004/0218620 A1 | 11/2004 | Palm et al. | |
| 2004/0233855 A1 | 11/2004 | Gutierrez et al. | |
| 2005/0227707 A1* | 10/2005 | Law | H04W 64/00 455/456.1 |
| 2006/0071785 A1* | 4/2006 | Ahmed | A01K 1/031 340/539.22 |
| 2006/0074494 A1* | 4/2006 | McFarland | G05B 15/02 700/1 |
| 2006/0244565 A1 | 11/2006 | Friedrich et al. | |
| 2007/0027948 A1* | 2/2007 | Engebretsen | G06F 1/181 709/203 |
| 2008/0160925 A1 | 7/2008 | Rofougaran | |
| 2008/0272887 A1* | 11/2008 | Brey | H04L 41/00 340/10.1 |
| 2009/0058609 A1 | 3/2009 | Clayman | |
| 2009/0096574 A1 | 4/2009 | Oberle | |
| 2009/0146839 A1 | 6/2009 | Reddy et al. | |
| 2009/0195363 A1 | 8/2009 | Downie et al. | |
| 2009/0231225 A1* | 9/2009 | Choudhury | H01Q 3/26 343/770 |
| 2009/0319649 A1 | 12/2009 | Larsen et al. | |
| 2010/0033307 A1 | 2/2010 | Narendra et al. | |
| 2010/0264211 A1 | 10/2010 | Jain et al. | |
| 2010/0265891 A1 | 10/2010 | Belcea et al. | |
| 2011/0286177 A1* | 11/2011 | Attlesey | H05K 7/20772 361/679.53 |
| 2012/0098664 A1 | 4/2012 | Nordin et al. | |
| 2012/0181869 A1* | 7/2012 | Chapel | H02J 9/06 307/64 |
| 2012/0249304 A1 | 10/2012 | Liu et al. | |
| 2013/0107853 A1* | 5/2013 | Pettus | H04W 84/10 370/330 |
| 2014/0006893 A1 | 1/2014 | Shetty et al. | |
| 2014/0113652 A1* | 4/2014 | Maguire | G01S 5/0289 455/456.1 |
| 2015/0055508 A1 | 2/2015 | Ashida et al. | |
| 2015/0280827 A1* | 10/2015 | Adiletta | H01P 3/10 398/116 |
| 2016/0078260 A1 | 3/2016 | Scholz et al. | |
| 2016/0080526 A1 | 3/2016 | Meyer-Graefe | |

FOREIGN PATENT DOCUMENTS

| | | |
|---|---|---|
| DE | 102007053078 | 3/2009 |
| DE | 102012016266 | 2/2013 |
| DE | 102011082002 | 3/2013 |
| EP | 1569386 | 6/2005 |
| EP | 2421344 | 2/2012 |
| EP | 2464204 | 6/2012 |
| WO | WO 2012/105083 A2 | 8/2012 |
| WO | WO 2015/150521 | 10/2015 |

OTHER PUBLICATIONS

International Search Report for International Patent Application No. PCT/EP2014/058533, dated Jun. 27, 2014, 2 pages.
German Search Report for German Patent Application No. 102013207755.6, dated Apr. 8, 2014, 10 pages.
International Search Report for International Patent Application No. PCT/EP2014/058537, dated Apr. 28, 2014, 3 pages.
German Search Report for German Patent Application No. 102013207760.2, dated Oct. 18, 2013, 10 pages.
German Search Report for German Patent Application No. 102014206387.6, dated Dec. 23, 2014, 12 pages.
Official Action for U.S. Appl. No. 14/787,577, dated Jan. 11, 2017, 16 pages.
Official Action for U.S. Appl. No. 14/787,577, dated May 17, 2017, 15 pages.
Notice of Allowance for U.S. Appl. No. 14/787,577, dated Mar. 29, 2018, 10 pages.
Official Action for U.S. Appl. No. 14/787,617, dated Sep. 20, 2017, 12 pages.
Official Action for U.S. Appl. No. 14/787,617, dated Apr. 5, 2018, 6 pages.
Notice of Allowance for U.S. Appl. No. 14/787,617, dated Aug. 15, 2018 5 pages.

* cited by examiner

ELECTRICAL INTERFACE MODULE

CROSS REFERENCE TO RELATED APPLICATIONS

This application is a national stage application under 35 U.S.C. 371 and claims the benefit of PCT Application No. PCT/EP2015/057321 having an international filing date of 2 Apr. 2015, which designated the United States, which PCT application claimed the benefit of German Patent Application No. 10 2014 206 387.6 filed 3 Apr. 2014, the disclosure of each of which are incorporated herein by reference.

FIELD

The invention relates to an electrical interface module.

BACKGROUND

Electrical interface modules are known from the prior art. These are often built into larger electrical systems.

In the context of the present invention, electrical interface modules are generally understood as being electronic components of automation technology that are used, for example, in switch cabinets of industrial systems. Examples of electrical interface modules are electronic switching devices, engine control units, (Ethernet) network elements, fieldbus components and systems, I/O devices, relay and protective devices, industrial communications technology devices, process control and measurement devices, monitoring devices and signaling devices.

This leads to the problem that these components must be labeled in circuit diagrams and also be provided with comprehensive instructions for assembly that include connection and/or installation. A test record or the like must also be included for each individual component.

The annotation of individual components and the arrangement of identifiers is cumbersome. What is more, in larger switching systems with relatively small installation space, there is barely enough space to fit an individual identifier.

As a rule, due to the lack of installation space, there are no type-specific assembly instructions available for installation and maintenance, so they must also be explicitly included.

The increasing restriction of installation space also leads to the omission of indicators to the greatest possible extent, since they take up precious installation space.

At the same time, it would be desirable to obtain additional data on the components in order to enable their replacement to be planned beforehand or an impending breakdown to be identified in advance based on actual signs of aging so that the components in question can be replaced.

In addition, it would be desirable to enable a fault condition in components to be easily identified. Furthermore, it would be desirable if the configuration of replacement components were quick and easy.

Moreover, it would be desirable if it were possible to read out general data, such as state data and/or error data and/or configuration data, for example, from the components and to input such general data into these components. The increasing demands on installation space progressively limit the availability of suitable interfaces. This effect is further intensified by the fact that the components are in part installed so as to be very inaccessible, so there is often no direct accessibility.

SUMMARY

It is the object of the invention to provide an improved electrical interface module that circumvents one or more drawbacks of the prior art in an inventive manner.

The object is achieved according to the invention by the features of the independent claim. Advantageous embodiments of the invention are specified in particular in the subclaims.

BRIEF DESCRIPTION OF THE DRAWINGS

In the following, the invention is explained in further detail with reference to the enclosed drawing on the basis of preferred embodiments.

DETAILED DESCRIPTION

Figure 1:
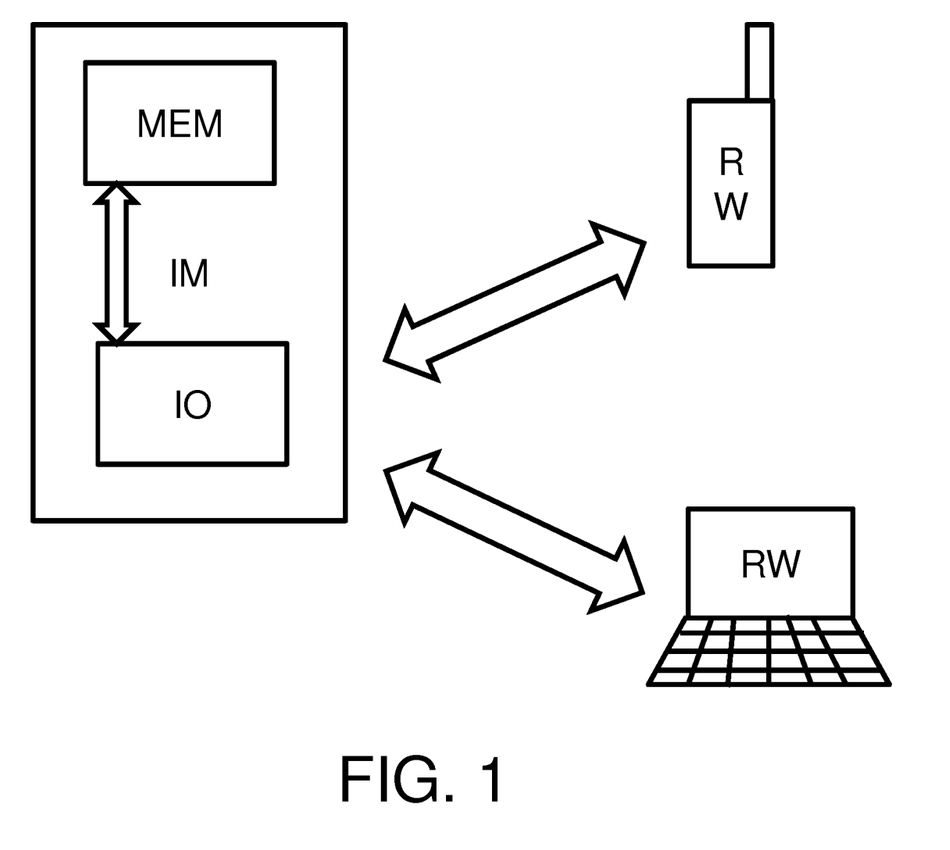
FIG. 1 shows a schematic representation of an electrical interface module according to a preferred embodiment of the invention.

FIG. 1 shows an electrical interface module IM according to one preferred embodiment of the invention.

The electrical interface module IM has a memory device MEM for storing data. Any suitable form of memory can be used here. For example, a flash memory or a NAND memory can be used as a memory, since these are able to store data even without current. This is especially helpful if the corresponding component is currentless and no power supply is present.

Moreover, the electrical interface module IM also has an integrated wireless interface IO that makes data available to an external reading device, or read/write device RW. In addition, the requirements for galvanic isolation are easier to meet.

The wireless interface IO can be embodied as an active or passive NFC interface, for example. In the case of a passive embodiment of the NFC interface IO, it does not require its own power supply; rather, the NFC interface IO is supplied from the wireless energy of a reading device or writing device. This is especially advantageous if the corresponding component is currentless or a functioning power supply is not present (any longer).

The data that are made available to the external reading device RW are selected from a group which includes:

product data, particularly a serial number and/or lot number and/or a date of manufacture and/or a manufacturer identification and/or a place of manufacture, operating instructions, assembly instructions, reference to an internet page, test data, particularly data on final manufacturing testing, state data, particularly fault status, degradation, configuration data, particularly parameterization data.

In this way, a user of the electrical interface module IM according to the invention is provided with a multitude of product-specific data that enable target application. Particularly, the startup of a system is simplified substantially, since assembly plans no longer have to be provided.

Moreover, important state data for the electrical interface module IM are made available to the user, such as, for example, fault status, degradation, configuration data, particularly parameterization data that are difficult to represent with conventional displays, particularly under the basic condition of a small installation space.

In another embodiment of the invention, the data that are made available to the external reading device RW are selected from a group which includes: startup data, identification of a site of installation, interval test data, status display, readout via an external reading device RW, type of external reading device RW used, climate data at the site of installation, particularly temperature and/or air humidity, line voltage faults, functionality, parametric data, location identification.

Figure 2:
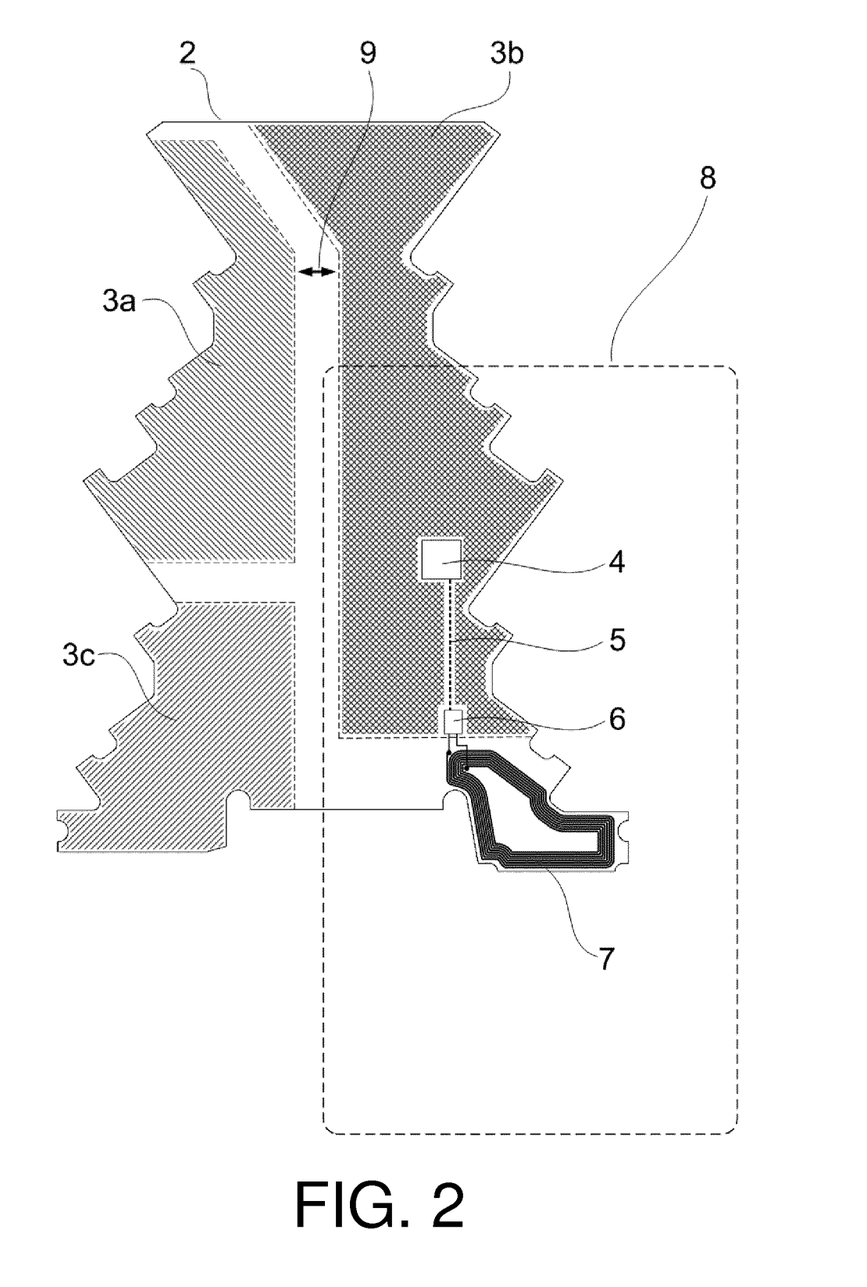
FIG. 2 shows an exploded schematic representation of an exemplary embodiment of an electrical interface module according to the invention.
Figure 3:
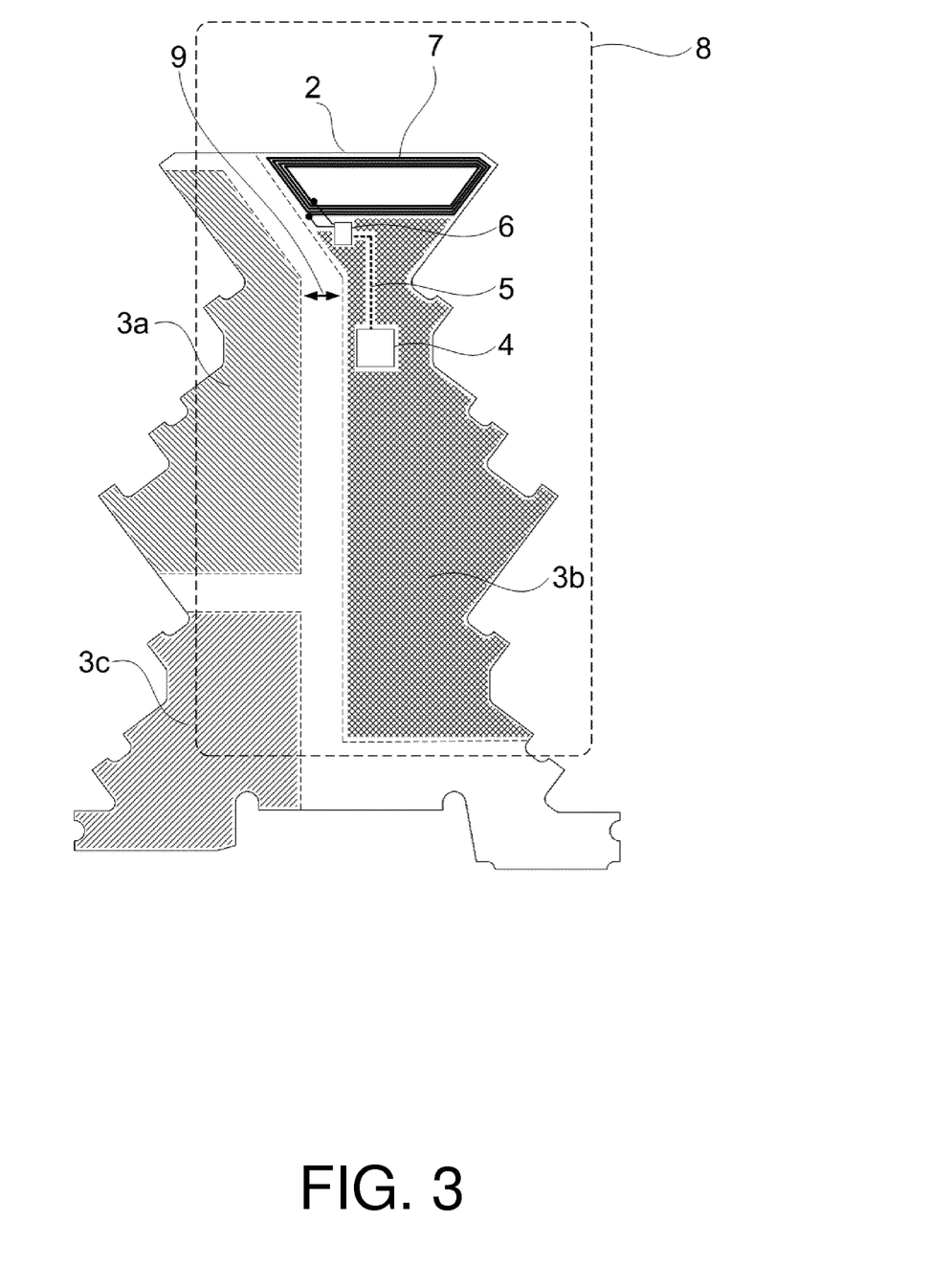
FIG. 3 shows an exploded schematic representation of another exemplary embodiment of an electrical interface module according to the invention.

These data simplify the inspection of an existing system. Furthermore, it is possible to differentiate between whether data are being read in or out by means of a special reading device RW, such as the laptop shown in stylized form at the bottom of FIG. 1, for example, or with a smartphone application, such as, for example, by means of the mobile telephone 8 shown in stylized form at the top of FIG. 1 and in FIGS. 2 and 3. However, the invention is not limited to these embodiments; rather, other embodiments can relate to a tablet PC as a reading device 8, for example. The possible orientation of the reading device RW can be different, as shown in FIGS. 2 and 3 in relation to the respective (planar) antenna 7, and this can be made dependent on the configuration of the respective reading device RW and/or of the mobile telephone 8 and the respective electrical interface module IM.

In another embodiment of the invention, the integrated wireless interface IO is embodied such that data are made available by an external writing device RW and stored in the memory device MEM.

In this other embodiment of the invention, it is preferred if the data that are made available by the external reading device RW are selected from a group which includes: product data, particularly a serial number and/or lot number and/or a date of manufacture and/or a manufacturer identification and/or a place of manufacture, operating instructions, assembly instructions, reference to an internet page, test data, particularly data on final manufacturing testing, and data for reordering from the manufacturer. The provision of the writing of data makes it possible to store all relevant production data, particularly test data and serial numbers, after the production of the electrical interface module IM without the need for a physical contact-type access to the memory MEM.

In this other embodiment of the invention, it is also preferred if the data that are made available by the external reading device RW are selected from a group which includes: startup data, identification of a site of installation, interval test data, readout via an external reading device RW, and type of external reading device RW used. These data simplify the inspection of an existing system.

In this other embodiment of the invention, it is also preferred if the data that are made available by the external reading device RW contain configuration data for the operating mode of the electrical interface module IM. For instance, the configuration data can contain various temperature characteristics, voltage or current ranges, or other customer-specific settings. In this way, the electrical interface module IM can be personalized or configured or parameterized with the aid of the wireless interface IO.

This is particularly advantageous for the passive operating mode of the wireless interface IO, since individual configuration data can be written in a contactless manner into the memory MEM beforehand, for example even in the packed state of the electrical interface module IM, and be available for the interface module IM at startup.

A provision can readily be made that at least a portion of the data that are product-specific are stored in a write-protected or password-protected manner. A portion of the installation-specific data can also be stored in a write-protected or password-protected manner. Different protective mechanisms and/or passwords can be provided.

In addition, a provision can be made that the data area for operating data is read-only when using a wireless interface.

Although the writing device and the reading device are described as separate devices, the functionality can also be made available together in one device.

Using the electrical interface modules IM according to the invention, the components can be registered easily in circuit diagrams through data transfer while still enabling the electrical interface modules IM to be identified according to the circuit diagrams. Furthermore, the electrical interface module IM according to the invention also makes it possible to provide assembly instructions for connection or installation, so that they are always present at the installation site. Separate storage or procurement of the assembly instructions is thus rendered unnecessary. In addition, a test record or the like can be enclosed with the electrical interface modules IM according to the invention.

Particularly in larger switching systems in which little space is available, identification is simplified considerably or expediently enabled by the invention.

Other indicators can also be implemented by means of the electrical interface modules IM according to the invention that would not otherwise be possible due to installation space specifications. In particular, the invention makes it possible to obtain additional data of the electrical interface module IM in order to enable their replacement to be planned beforehand or an impending breakdown to be identified in advance based on actual signs of aging so that the components in question can be replaced.

The use of wireless interfaces IO also proves advantageous because a larger quantity of data can be made available in comparison to a local and—due to the small amount of available installation space—small display. Particularly, the data can be stored as xml data.

The described construction particularly enables the manufacture of flat electrical interface modules IM, thus minimizing the space requirement while making new functionality available. In particular, the described construction enables electrical interface modules IM to be provided that have a width of less than 36 mm, particularly less than 23 mm, particularly less than 18 mm, particularly less than 13 mm, and especially preferably less than 7 mm.

In the 7 mm embodiment, for example, the construction makes possible a substrate 2 that is SMD-enabled on at least one side—for example, a printed circuit board having the wireless interface IO and the actual interface elements. This substrate 2 can then be readily arranged in a narrow housing. Moreover, different regions 3a, 3b, 3c are designated on the substrate that are available for different tasks of the electrical interface module and of the components required for same. Alternatively or in addition, the different regions 3a, 3b and 3c can also designate different potential groups that are galvanically isolated from one another, for example, and can be coupled with the aid of coupling elements. Such an exemplary arrangement is shown in FIGS. 2 and 3.

In addition, a wired bus system can also be provided. In particular, an exemplary bus system can also be provided that is located on the mounting rail 11 and is contacted by the individual electrical interface modules IM upon placement onto the mounting rail 11.

In another embodiment, a provision is made that the substrate 2 has a planar antenna 7 for the integrated wireless interface IO. In this way, improved exchange between the individual electrical interface modules IM is made possible and flat electrical interface modules IM are provided.

The integrated wireless interface can be constructed as shown schematically in FIGS. 2 and 3, for example. Besides the actual transceiver unit that is present in a chip 6, for example, the wireless interface IO can also have a planar antenna 7. In some embodiments, the chip 6 can readily also have the antenna 7 already integrated, or an antenna can be added as a component, for example as a coil. Obviously, such a coil that acts as an antenna 7 can also be embodied as an SMD-ready component or as an antenna in the plastic housing, or it can be adhered to the housing wall by means of a film. A planar antenna can also be embodied as an independent component; otherwise, the planar antenna 7 can also be made from conductive paths on the substrate 2. In addition, a connection is established to other parts on the electrical interface module IM by means of a suitable connection. A connection to a controller 4 via another interface 5 is shown for the sake of example in FIGS. 2 and 3. Besides a 1-wire bus, exemplary interfaces can also have other serial or parallel interfaces or other interfaces, such as an $I^2C$ bus, for example. The controller can be a microcontroller or any other logic circuit.

Figure 4:
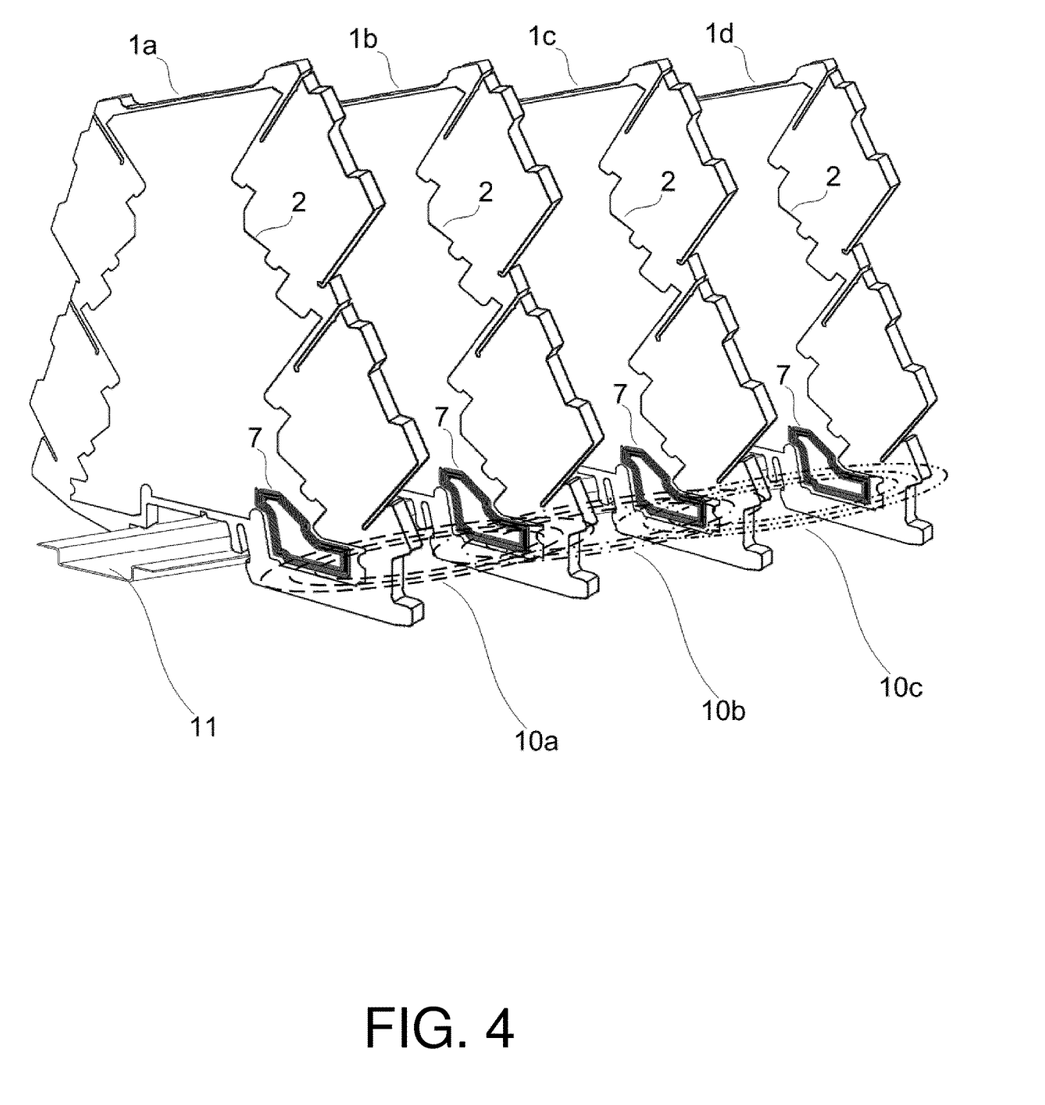
FIG. 4 shows an exploded schematic representation of a plurality of electrical interface modules according to exemplary embodiments of the invention in relation to one aspect of the invention.

FIGS. 2, 3 and 4 show different views of various embodiments. The electrical interface module IM is suitable for mounting on a mounting rail 11. An exemplary mounting rail 11 can be a top-hat rail, for example.

In the embodiment that is shown in FIG. 2, the (planar) antenna is arranged in the vicinity of the mounting area for the mounting rail 11. As a result, more installation space is left for the actual interface components and the connectors and displays in the opposing region.

In the embodiment that is shown in FIG. 3, the (planar) antenna 7 is arranged in a region that lies opposite the mounting areas for the mounting rail 11. This facilitates communication with an external reading device RW, whereby the latter can already communicate—that is, exchange data—with the electrical interface module IM from a greater distance.

To a person skilled in the art, it is readily clear that other positions between these two positions can be provided for the (planar) antenna 7 or the chip 6 in order to benefit at least partially from the respective advantages.

It is especially advantageous if adjacent electrical interface modules IM are arranged such that they can exchange data and/or power with other nearby electrical interface modules IM via the respectively integrated wireless interface IO. FIG. 4 shows one such exemplary arrangement in which the desirable but not necessary case of the uniform arrangement of the wireless interfaces at least in relation to the respective (planar) antennas 7. For the sake of example, FIG. 4 shows aligned electrical interface modules IM, each of which has its own housing 1a, 1b, 1c, . . . . Arranged within the housing is at least one substrate 2 on which a (planar) antenna 7 is arranged. To facilitate illustration, the respective lines of magnetic flux are shown as might form during a data and/or power exchange between the individual electrical interface modules IM. For example, the flux lines 10a—represented by broken lines—might form from the first interface module IM located in a housing 1a. These flux lines 10a can engage, for example, into the area of the (planar) antenna 7 of the second interface module, which is adjacent to the first interface module, thus enabling power and/or data to be exchanged between the adjacent interface modules by means of the field. This is also possible in similar fashion for the second interface module, with the magnetic flux lines 10b being represented by dash-dot lines here for the sake of differentiation. The flux lines can of course also be such that they can also transmit power and data beyond an adjacent interface module. For instance, gaps and/or faulty electrical interface modules can be bridged over and/or, as will be described later, even identified as being faulty and/or reconfigured.

In one exemplary embodiment, the adjacent interface modules IM are embodied such that adjacent electrical interface modules IM form a logical data bus over the integrated wireless interface IO that can be addressed and/or controlled by means of at least one head module or master module with a higher control and/or monitoring unit. For example, one of the interface modules can be assigned the function of a master module, or a special head module that acts as a master is disposed on one side of adjacent electrical interface modules IM or between adjacent electrical interface modules IM.

In one embodiment, a provision is made, for example, that adjacent electrical interface modules IM form an ad hoc network in which one of the adjacent electrical interface modules IM assumes a master function and the other electrical interface modules IM adjacent thereto assume a slave function. In FIG. 4, for example, the middle electrical interface module IM, represented in stylized form by the housing 1b, or one of the external electrical interface modules IM, represented in stylized form by one of the housings 1a or 1c, assumes the role of the master, whereas the respective remaining ones act as slaves in relation to this electrical interface module.

The master can be selected based on a predetermined procedure. For example, the selection can be based on one or more of the following criteria:
product data
configuration data
first operable interface module
priority
time sequence.

It should be noted that the writing and/or reading device RW can of course also assume the master function, particularly in the case of the wireless interface IO.

Moreover, the writing and/or reading device RW can also be connected to the last subscriber or to a head module.

One possibility for the selection of the master will be described briefly for the sake of example with reference to a wireless interface IO.

In the following, a CAN base for the wireless interface IO is assumed as an example of a multi-master system. In a CAN base for the wireless interface IO, each subscriber can become a master; that is, the system is a so-called multi-master system. The subscribers of the multi-master system—that is, inter alia the electrical interface modules IM—transmit data with a certain ID that the respective other subscribers can evaluate.

With CAN, for example, the master function can be established quickly, because only the one with the highest priority obtains bus access in the event of simultaneous transmission. This can be determined based on the address, for example, in which case the lowest address is the bus master, for example. In this case, the other subscribers can withdraw.

In order to achieve this, it can be ensured on a higher protocol layer—for example, on the application level or the level 7—that the other subscribers—i.e., other electrical interface modules IM, for example—only transmit when the respective master prompts them to transmit. In the event of a malfunction on the part of the respective master, a provision can then be made that another electrical interface module IM assumes this master function.

This would be advantageous, for example, if the master were determined randomly in the event of a failure; after all, in that case, and if the master module $1f$ unable to terminate its transmission because a higher-priority telegram (e.g., CAN) has been detected, the other subscribers—i.e., the electrical interface modules IM—would have to wait until they receive a request for transmission or the like from the new master, which, in turn, can have been determined in the same manner as before—based on the highest priority, for example.

A provision can then be made that it is also ensured on the higher protocol layer that the electrical interface modules IM with slave function that did not come into play due to the fault of the previous master are now again prompted again to transmit.

Moreover, a provision can be made that the adjacent electrical interface modules IM exchange data by means of the wireless interfaces IO using a higher network protocol, i.e., that the wireless interfaces IO in the ISO/OSI layer model make only one or more lower layers available—the physical layer, for example—whereas the upper layer or the upper layers are made available by another protocol. Some examples of higher network protocols are interbus, I²C bus, RS232, ASI, . . . , with the physical layer of these network protocols being made available by the physical layer of a wireless interface IO, for example.

In embodiments of the invention, a provision can also be made that the electrical interface module IM stores at least portions of configuration data of at least one directly adjacent electrical interface module IM and the availability of this directly adjacent electrical interface module IM is monitored. In FIG. 4, for example, the electrical interface module that is represented in stylized form by the housing $1b$ can monitor the directly adjacent electrical interface module IM that is represented in stylized form by the housing $1c$ and store at least a portion of the configuration data thereof. Monitoring can be performed in different ways, e.g., by monitoring whether communication is present, or through targeted queries. Even though only one instance of monitoring and storage in one direction was described in the above example, a provision can of course also be made that monitoring is also performed of the other adjacent electrical interface module IO/$1a$. Furthermore, this monitoring can also be set up such that it encompasses not only the directly adjacent electrical interface modules but also more distant electrical interface modules. For example, a provision could be made that the first interface module IM/$1a$ in FIG. 4 also monitors the electrical interface module IM/$c$.

If it is now found that the adjacent electrical interface module IM is defective, then the fault can be communicated to other interface modules. In particular, a fault can be communicated to a master module and/or a head module and displayed.

Alternatively or in addition, a provision can also be made that the fault is communicated to other devices, such as a monitoring unit.

If the electrical interface module in question is now replaced, then a provision can be made that the storing electrical interface module IM/$1b$ now optionally checks this alternatively inserted electrical interface module IM/$1c$ for suitability with respect to the stored configuration data by communicating via the wireless interface IO.

If such a check is provided and was successful, a provision can then be made that the stored configuration data are transmitted to the replaced electrical interface module. This step can of course also be provided independently of a check.

Moreover, a provision can also be made that, only once the configuration has been completed and the now-completed configuration has been transmitted to the respective storing adjacent electrical interface modules, they now compare the received configuration with the still-stored configuration and only enable the operational release of the replaced interface module in the case of a successful similar configuration, e.g., through commensurate signaling by means of the wireless interface IO. Such a method could be advantageous for secure (sub-)systems with a predetermined safety integrity level—e.g., SIL according to IEC 61508. In addition, the replacement of defective electrical interface modules is made substantially easier, since no further influencing from the outside is necessary, so the effort for the otherwise necessary reconfiguration is omitted.

In another embodiment, the determination of a fault point of a malfunctioning electrical interface module IM within a plurality of adjacent electrical interface modules IM is enabled.

One possibility for determining the fault point lies in the fact that adjacent electrical interface modules IM form a logical chain. The first electrical interface module IM or a head module KM or a master module, for example, can determine the length of the chain by continuously forwarding a forwarding signal in the chain from one electrical interface module IM to the next logical electrical interface module IM until either the end of the chain has been reached or until the forwarding receives no acknowledgment. For example, the forwarding signal can contain a counter that is incremented or decremented upon being successfully forwarded. The logically last element that can still be reached responds with its place in the logical chain, so that the respective first electrical interface module or the master module or the head module can now determine based on the previously known length of the logical chain whether it matches with the determined length of the chain and, if not, the location of the fault can now be identified based on the last reported place as immediately following the last responding element in the chain.

In other alternative or additional embodiments, a provision can also be made that the immediately adjacent electrical interface modules IM monitor the state of an electrical interface module IM as described previously and, in the event of a malfunction, the fault is reported to the first electrical interface module (e.g., if in FIG. 7 or 8) or the master module or the head module KM.

In the event that the master module fails, a provision can be made that the adjacent or another electrical interface module IM assumes this function.

It may also be the case that, for a fault within the station, the station is divided into two or n autarkic subsystems and the local processing is continued with the exception of the failed device, for example.

By means of the invention, an electrical interface module IM is also made available that has a memory device MEM for storing data and an integrated wireless interface IO. The data are made available to an external reading device RW. The electrical interface module IM contains a substrate 2, for example, on which the memory device MEM and the integrated wireless interface IO are arranged. The electrical interface module IM is capable of exchanging data with other nearby electrical interface modules IM via the integrated wireless interface IO. Adjacent electrical interface modules IM form a logical bidirectional data bus via the respective integrated wireless interfaces IO, with data being made available by one nearby electrical interface module IM or the other nearby electrical interface modules IM via the integrated wireless interface(s) IO in the manner of a bus to the external reading device RW either directly or indirectly via a head module KM, with each electrical interface module IM making a unique identification available via the integrated wireless interface IO, thereby enabling unambiguous identification of every electrical interface module IM.

Figure 5:
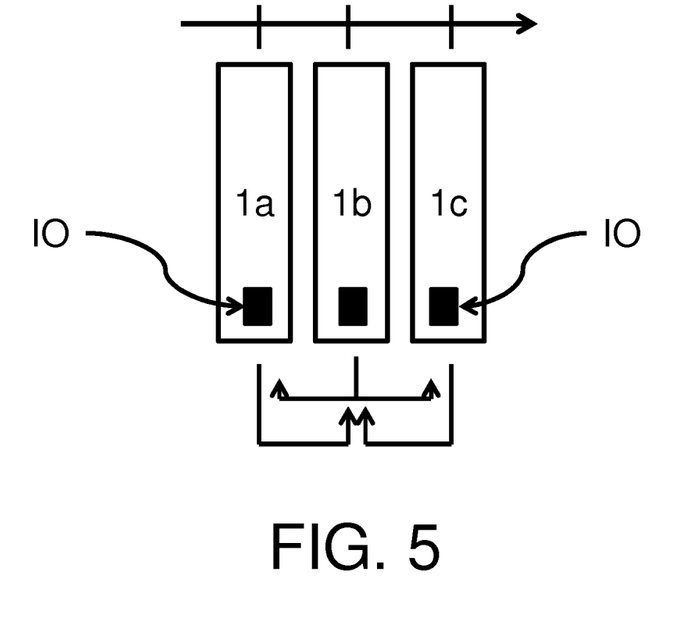
FIG. 5 shows a schematic representation of electrical interface modules for illustrating position detection in a first exemplary embodiment.

FIG. 5 shows an example of an arrangement of 3 electrical interface modules with external housing forms 1a, 1b, 1c, each representing an electrical interface module IM. In the following, the reference symbol for a housing form will also be used to represent a respective electrical interface module. Each of the electrical interface modules IM has a wireless interface IO, which is represented symbolically as a black rectangle. As is indicated by the arrows below the electrical interface modules 1a, 1b, 1c, the electrical interface module 1a can communicate bidirectionally with the electrical interface module 1b. The electrical interface module 1c can also communicate bidirectionally with the electrical interface module 1b. Due to the spatial separation and its limited physical range, the electrical interface module 1a cannot communicate directly and bidirectionally with the electrical interface module 1c, for example. Via the BUS that is formed, represented for the sake of example as an arrow above the electrical interface modules, the electrical interface module 1a can now communicate, i.e., exchange data, with the electrical interface module 1c and vice versa with the aid of the electrical interface module 1b. Now it is possible to connect (wirelessly) to any point by means of an external reading device RW of this BUS, so all of the devices of the bus can make data available to the external reading device RW and/or all electrical interface modules 1a, 1b, 1c can also receive data from an external reading device RW without the need to couple each of the electrical interface modules 1a, 1b, 1c individually. This improves manageability substantially.

The forwarding of data by an electrical interface module IM to another electrical interface module IM that is out of its range can be set up in different ways. It is preferred, however, that one or more electrical interface modules IM that are located spatially between the transmitting and the receiving electrical interface module IM forward the received data in the manner of a repeater.

In other embodiments, for example with a circulating telegram, a provision can be made that data are input in certain areas of a message, that is, a certain section within such a circulating telegram is available to each electrical interface module IM.

In the embodiment of FIG. 5, the individual electrical interface modules IM are able to determine a position relative to one another. For instance, the electrical interface module 1a is capable of recognizing that, due to the limited range of typical near-field communication interfaces IO, it is able to communicate with only exactly one other electrical interface module 1b. The same applies to the electrical interface module 1c. That is, the two electrical interface modules 1a, 1c are at the periphery. In contrast, the electrical interface module 1b can reach two electrical interface modules 1a and 1c with the same range of the wireless interface IO, and it can be deduced from this that, given a range of up to one adjacent electrical interface module IM, the electrical interface module 1b occupies a middle position.

For example, an electrical interface module (IM) can receive a message of a nearby electrical interface module, with the message having the unique identification of the transmitting electrical interface module. There is then a predetermined waiting time to see whether other nearby electrical interface modules transmit another message within the predetermined time, this message also having the unique identification of the now-transmitting electrical interface module. Upon lapsing of the predetermined time, the electrical interface module (IM) can now evaluate based on the number of unique identifications received whether the receiving electrical interface module is in a middle position or a peripheral position in relation to adjacent electrical interface modules.

Figure 6:
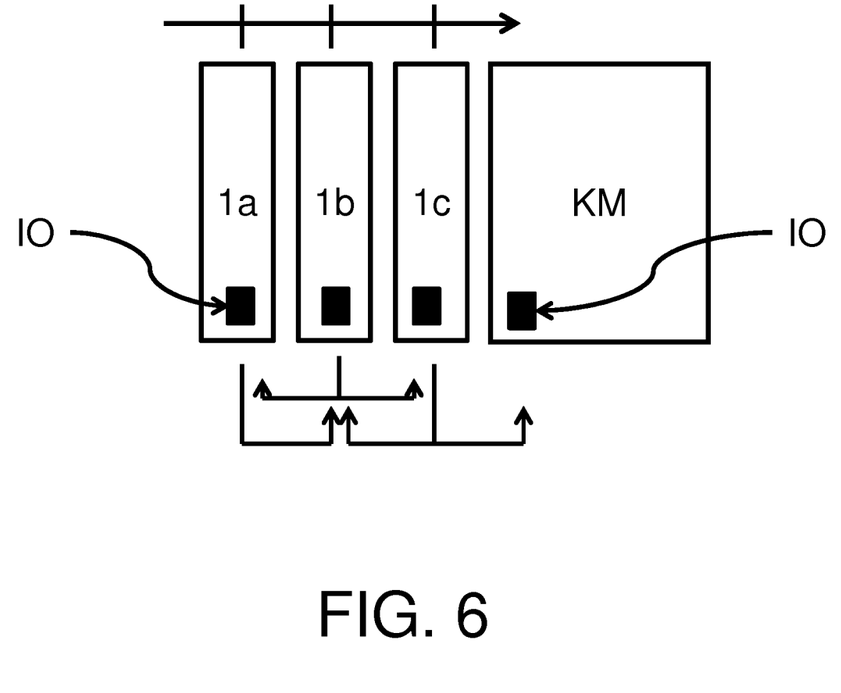
FIG. 6 shows a schematic representation of electrical interface modules for illustrating position detection in a second exemplary embodiment.

Unlike FIG. 5, FIG. 6 has a head module KM. Now, for example, the external reading device RW and the external reading device RW can be coupled to the BUS alternatively via the head module KM as described above.

In the embodiment of FIG. 6, an absolute position can be additionally determined from the knowledge of a head module KM, since the electrical interface module 1c is now the only electrical interface module that can communicate directly with the head module KM and another electrical interface module 1b. This information can then be used as detection continues to put the electrical interface modules into a logical order according to their physical arrangement (e.g., beginning from the head module KM). In the event of a fault, for example, this enables the precise localization of a fault event.

But even in the absence of a fault event, the possibility of localization is advantageous, since a virtual snapshot of the installation situation can be made possible by the localization of the individual electrical interface modules; for instance, the logical order along a mounting rail on which the corresponding electrical interface modules IM and, optionally, a head module KM are arranged can be visualized on an external reading device RW.

It should also be noted that the external reading device RW can also assume the function of the head module KM, so the coupling of an external reading device RW also makes it possible to visualize the logical order along a mounting rail on which the corresponding electrical interface modules IM and, optionally, a head module KM are arranged, or to spatially determine a fault point.

For example, a provision can be made that the electrical interface module receives a piece of information from a head module (KM) or a reading device (RW) to the effect that the electrical interface module (IM) is to be the first electrical interface module of a logical chain and can thus produce a logical representation of the physical arrangement of the adjacent electrical interface modules based on the number and identification of the adjacent electrical interface modules identified via the wireless interface at a first point in time.

Figure 7:
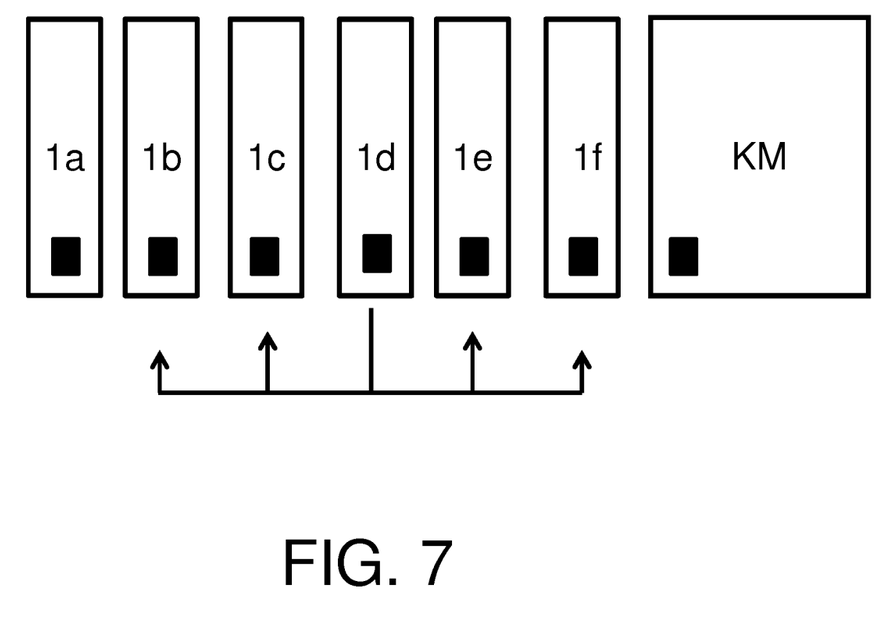
FIG. 7 shows a schematic representation of electrical interface modules for illustrating position detection in a third exemplary embodiment in a fault-free state.
Figure 8:
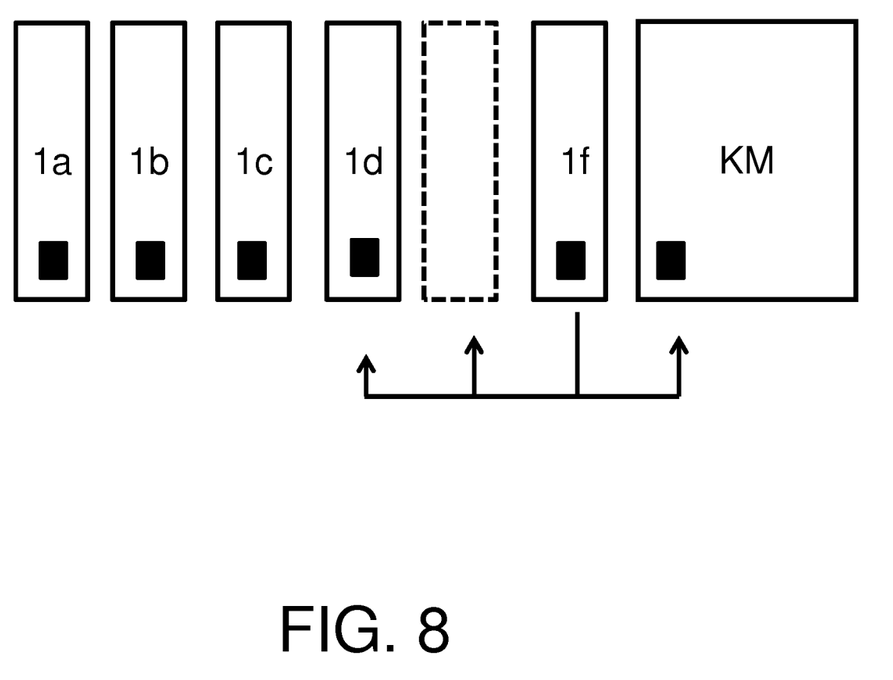
FIG. 8 shows a schematic representation of electrical interface modules for illustrating position detection in the third exemplary embodiment in a fault state.

For example, the electrical interface module 1d in FIGS. 7 and 8, respectively, monitors the functioning of the adjacent electrical interface modules 1c and 1e (and optionally also 1b and 1f, or even more distant modules depending on its range).

This monitoring can be supported, for example, by the bus system used on the BUS. For instance, if data are exchanged periodically, then the absence of a message or a response to a message can be regarded as a fault condition. In other cases, each electrical interface module is monitored for activity in a certain time period, and if no activity can be detected, the monitored electrical interface module is actively queried.

If a fault condition of one of the adjacent electrical interface modules (in FIG. 8, electrical interface module 1e) is now identified, the identified fault can be relayed. Both relaying only within the bus BUS and forwarding to any existing head module KM or to an external reading device RW can be provided.

In other words, it is possible, for example, to identify a fault condition based on the number of adjacent electrical interface modules detected via the wireless interface IO at a first point in time and the number of adjacent electrical interface modules detected via the wireless interface IO at a second point in time.

Beyond that, a relative localization of the fault is also possible in the embodiment of FIG. 5; for example, an electrical interface module IM immediately adjacent to the fault point can be identified. What is more, an absolute fault point can be indicated in the embodiment of FIG. 6.

In FIGS. 7 and 8, it is assumed that the range of the wireless interface IO (each) comprises two adjacent electrical interface modules, for example. This is represented in FIGS. 7 and 8 by the fact that the signal strength has been depicted as arrow length. That is, in FIG. 7, the electrical interface module identifies not only the immediately adjacent electrical interface modules 1c and 1e, but also the somewhat more distant electrical interface modules 1f and 1b.

The electrical interface module 1d now monitors the functioning of these adjacent electrical interface modules.

This monitoring can be supported, for example, by the bus system used on the BUS. For instance, if data are exchanged periodically, then the absence of a message or a response to a message can be regarded as a fault condition. In other cases, each electrical interface module is monitored for activity in a certain time period, and if no activity can be detected, the monitored electrical interface module is actively queried.

If a fault condition of one of the adjacent electrical interface modules is now identified, the identified fault can be relayed. Both relaying only within the bus BUS and forwarding to any existing head module KM or to an external reading device RW can be provided.

In other words, it is possible, for example, to identify the location of a fault condition based on the number and identification of adjacent electrical interface modules detected via the wireless interface IO at a first point in time and the number of adjacent electrical interface modules detected via the wireless interface IO at a second point in time.

In FIG. 8, for example, the electrical interface module 1e from FIG. 7 has become defective or intentionally removed.

Table 1 below shows an identification matrix of the individual electrical interface modules at a first point in time according to FIG. 7.

TABLE 1

| Handset Transmitter | 1a | 1b | 1c | 1d | 1e | 1f |
|---|---|---|---|---|---|---|
| 1a | / | X | X | | | |
| 1b | X | / | X | x | | |
| 1c | X | X | / | x | X | |
| 1d | | X | X | / | X | X |
| 1e | | | X | x | / | X |
| 1f | | | | x | X | / |

Here again, it assumed that each electrical interface module IM, due to the limited range of the wireless interface IO in each direction, can communicate (only) with a maximum of two adjacent electrical interface modules, respectively.

The neighbor relationships can be unambiguously derived from this matrix based on the number and identification of the individual electrical interface modules. This can also be further supported by a qualitative indication in relation to the measured field intensity of a signal, thus enabling the individual electrical interface modules IM to more precisely identify their spatial relationship and mutual spacing. In addition, the measuring of field intensities also enables other data to be derived, such as the presence of foreign objects or voids. This is made possible, for example, by the detection of only one adjacent electrical interface module instead of two (in FIG. 8, for example, under the assumption that electrical interface module 1e was not installed, the void could be detected by the electrical interface module 1f or 1d).

With the aid of the spacing information—obtained, for example, through field intensity measurements—wider interface modules can also be identified, for example. This can, for example, also be supported by having each module communicate its current installation width via the bus system.

If a fault then occurs in electrical interface module 1e according to FIG. 8, it results in Table 2, which differs from Table 1.

TABLE 2

| Handset Transmitter | 1a | 1b | 1c | 1d | 1e | 1f |
|---|---|---|---|---|---|---|
| 1a | / | X | X | | | |
| 1b | X | / | X | x | | |
| 1c | X | X | / | x | — | |
| 1d | | X | X | / | — | X |
| 1e | | | — | — | / | — |
| 1f | | | | x | — | / |

That is, it is now possible to detect the void, namely between electrical interface modules 1d and 1f, and it can be deduced through a comparison to Table 1 that the electrical interface module 1e is defective or has been removed.

For example, an electrical interface module can upon receiving a message also determine a field intensity of a received message and thus still identify, after the predetermined time has passed, a neighboring void or a greater spatial distance based on the field intensity during the evaluation.

In one especially advantageous embodiment, a provision is made that the electrical interface module IM can exchange power with one other nearby electrical interface module IM or the other nearby electrical interface modules IM via the integrated wireless interface IO. This enables the autarkic operation of monitoring units within the electrical interface modules, for example, so no auxiliary power need be diverted.

This proves to be especially advantageous in a fault condition of the electrical interface module IM.

In the fault condition, if the electrical interface module IM also loses its (auxiliary) power supply for the interface from the electrical interface module IM, then power can be drawn alternatively or in addition via the integrated wireless interface IO.

It is assumed here that the wireless interface IO itself is not faulty in the fault condition. The power "gained" via the wireless interface IO can then be used to transmit data, e.g., fault data or recently acquired configuration data, of the electrical interface module IM to adjacent electrical interface modules IM. This facilitates substantially the fault diagnostics and reconfiguration after the replacement of the electrical interface module in question.

The invention thus makes use of a wireless infrastructure that is inherently designed for a constantly changing environment for a rather static application. However, range characteristics of the wireless interface IO are exploited in particular in order to localize faults or voids. The wireless interfaces IO of the individual electrical interface modules IM make a bidirectional data link available.

The electrical interface modules IM can form a bus system with several subscribers, the electrical interface modules IM being unambiguously identifiable.

Data of any type can then be transmitted along a virtual "chain" that results from the neighbor relationships of the electrical interface modules IM via the respective wireless interfaces IO.

In this way, the physically limited range of the wireless interface IO of typically a few centimeters can be overcome, since the communication with the adjacent electrical interface modules IM and the subsequent forwarding of the data enables the range to be extended.

What is more, the physically limited range of the wireless interface IO can be exploited in order to determine relative positioning along a chain.

The invention therefore makes available a self-configuring system in which newly inserted electrical interface modules IM (or even a newly inserted head module KM) can be identified and added to the bus system (hot plug capability). On the other hand, however, defective electrical interface modules IM or electrical interface modules IM with malfunctions can be identified and reported by adjacent functioning electrical interface modules IM or a head module KM. The report can remain within the bus BUS or be forwarded to a head module KM and/or to an external reading device RW.

While the wireless interfaces IO are typically supplied with auxiliary power by their own electrical interface modules IM, a provision can optionally be made that the power is also made available via the magnetic field of an adjacent electrical interface module IM (or of several adjacent electrical interface modules IM).

The wireless interface IO can take an active as well as a passive form. What is more, the individual electrical interface modules IM can also assume different roles during their use; for example, an electrical interface module IM can first be a master-like initiator and query adjacent electrical interface modules IM, whereupon a role change can occur and the initiating electrical interface module IM can become a slave.

Configuration data as well as (quasi-)continuous data streams of the electrical interface modules IM themselves can be exchanged via the BUS. These data can be wanted signals of the modules, for example. For instance, a nominal signal (e.g., 4 mA-20 mA) pending at the input of an interface module can be transmitted in digitized form via the data bus and undergo further processing externally. It is also possible to transmit global messages such as configuration data or shutoff data, for example in case of a fault condition that is indicated by an (external) control.

The bus can be readily equipped with one or more head modules KM. The head module KM can forward the data to a higher-level system or be equipped with other communications interfaces (for example, other wireless interfaces such as WLAN or Bluetooth), or it can offer better accessibility to a (wirelessly connected) external reading device RW.

Insofar as reference has been made to a wireless interface, the invention is not limited to NFC, which is merely one example of a near-field transmission technology. Another example of a near-field transmission technology is RFID in the kHz and MHz range, which can be used as an alternative to NFC.

Other transmission technologies such as ZigBee, Bluetooth Low Energy or UHF-RFID can also be used that are not based directly on near-field transmission technology, but rather are designed and/or optimized only for short distances by means of transmitting powers and antenna types.

LIST OF REFERENCE SYMBOLS

Electrical interface module IM
Memory MEM
Wireless interface, NFC/RFID interface IO
Writing device, reading device RW
Housing 1; 1a, 1b, 1c, 1d, 1e, 1f
Substrate 2
Component regions 3a, 3b, 3c
Controller 4
Interface 5
Interface chip 6
Antenna (planar) 7
Mobile telephone, smartphone, tablet PC 8
(Magnetic) flux lines 10a, 10b, 10c
Mounting rail 11
Head module KM

What is claimed is:
1. An electrical interface module comprising:
a memory device for storing data; and
an integrated wireless interface that makes data available to an external reading device and/or a head module, the electrical interface module being arrangeable on a mounting rail, the mounting rail being a top-hat mounting rail,
wherein the electrical interface module can exchange data with other electrical interface modules on the mounting rail via respective integrated wireless interfaces,
wherein the electrical interface module and the other electrical interface modules form a logical bidirectional data bus to exchange the data via the respective integrated wireless interfaces,
wherein the data are made available by the respective integrated wireless interfaces in the manner of the logical bidirectional data bus to the external reading device and/or the head module, wherein the electrical interface module makes a unique identification available via the integrated wireless interface so that the electrical interface module is unambiguously identifiable from among the other electrical interface modules, wherein the electrical interface module, on the basis of an amount of unique identifications respectively received from the other electrical interface modules, determines whether the electrical interface module is in a middle position or in a peripheral position in relation to directly adjacent electrical interface modules, and wherein a communications range of the integrated wireless interface is limited to directly adjacent integrated wireless interfaces of the directly adjacent electrical interface modules.

2. The electrical interface module as set forth in claim 1, wherein the electrical interface module forwards the data in the manner of a repeater.

3. The electrical interface module as set forth in claim 1, wherein the electrical interface module monitors the functioning of one or more of the directly adjacent electrical interface modules and, in the event that a fault condition of the one or more of the directly adjacent electrical interface modules is identified, reports the identified fault condition.

4. The electrical interface module as set forth in claim 3, wherein the electrical interface module identifies the fault condition based on a number of the one or more of the directly adjacent electrical interface modules detected via the integrated wireless interface at a first point in time and a number of the one or more of the directly adjacent electrical interface modules detected at a second point in time.

5. The electrical interface module as set forth in claim 3, wherein the electrical interface module identifies a location of the fault condition based on a number of the one or more of the directly adjacent electrical interface modules detected via the integrated wireless interface at a first point in time and a number of the one or more of the directly adjacent electrical interface modules detected at a second point in time.

6. The electrical interface module as set forth in claim 1, wherein the electrical interface module creates a representation of a physical arrangement of the other electrical interface modules based on a number and identification of the other electrical interface modules detected via the integrated wireless interface at a first point in time.

7. The electrical interface module as set forth in claim 1, wherein the electrical interface module can exchange power with the directly adjacent electrical interface modules via the integrated wireless interface.

8. The electrical interface module as set forth in claim 7, wherein the power is drawn via the integrated wireless interface only in case of a fault condition of the electrical interface module, the integrated wireless interface not being faulty in the fault condition, and the power for transmitting fault data of the electrical interface module to the directly adjacent electrical interface modules being available.

9. The electrical interface module as set forth in claim 1, wherein the electrical interface module includes a mounting section that mounts to a first flat portion and a second flat portion of the mounting rail, the first flat portion and the second flat portion being raised from a third flat portion of the mounting rail.

10. The electrical interface module as set forth in claim 9, wherein the mounting section comprises a recess including a first step portion and a second set portion, and wherein the first step portion rests on the first flat portion and the second step portion rests on the second flat portion when mounted to the mounting rail.

11. The electrical interface module as set forth in claim 1, wherein the integrated wireless interface includes a planar antenna to exchange the data.

12. The electrical interface module as set forth in claim 11, wherein the planar antenna of the integrated wireless interface is located on the electrical interface module such that the planar antenna of the integrated wireless interface is aligned with other planar antennas included in the integrated wireless interfaces of the other electrical interface modules on the mounting rail.

13. The electrical interface module as set forth in claim 1, wherein the electrical interface module and the other electrical interface modules form an ad hoc network via the respective integrated wireless interfaces.

14. A system comprising a plurality of electrical interface modules as set forth in claim 1, wherein the plurality of electrical interface modules are mounted on the mounting rail.

15. The system as set forth in claim 14, further comprising a head module.

16. A method for the electrical interface module according to claim 1 for identifying the relative locations in a system, the method comprising:

receiving one or more messages having the unique identifications;

upon lapsing of a predetermined time, evaluating, based on the number of unique identifications received, whether the electrical interface module is in the middle position or the peripheral position in relation to the directly adjacent electrical interface modules.

17. The method as set forth in claim 16, further comprising determining a field intensity of the one or more messages, wherein the evaluation upon lapsing of the predetermined time also identifies an adjacent void based on the field intensity.

18. The method as set forth in claim 16, further comprising receiving a piece of information from the head module or the external reading device to the effect that the electrical interface module is to be a first electrical interface module of a logical chain; and producing a logical representation of physical arrangement of the other electrical interface modules based on a number and identification of the other electrical interface modules identified at a first point in time.

* * * * *